(12) United States Patent
Ikeda et al.

(10) Patent No.: US 12,662,389 B2
(45) Date of Patent: Jun. 23, 2026

(54) METHOD FOR PRODUCING LITHIUM-CONTAINING SOLUTION

(71) Applicant: SUMITOMO METAL MINING CO., LTD., Tokyo (JP)

(72) Inventors: Osamu Ikeda, Niihama (JP);
Masatoshi Takano, Niihama (JP);
Satoshi Asano, Niihama (JP); Shin-ichi Heguri, Niihama (JP); Shin-ya Matsumoto, Niihama (JP); Yohei Kudo, Niihama (JP); Yusuke Senba, Niihama (JP); Kyohei Maeda, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 687 days.

(21) Appl. No.: 17/923,111

(22) PCT Filed: Mar. 30, 2022

(86) PCT No.: PCT/JP2022/015851
§ 371 (c)(1),
(2) Date: Nov. 3, 2022

(87) PCT Pub. No.: WO2022/210847
PCT Pub. Date: Oct. 6, 2022

(65) Prior Publication Data
US 2023/0174385 A1 Jun. 8, 2023

(30) Foreign Application Priority Data
Mar. 31, 2021 (JP) ................................. 2021-059031

(51) Int. Cl.
*C01D 15/04* (2006.01)
*B01J 39/02* (2006.01)
(Continued)

(52) U.S. Cl.
CPC .............. *C01D 15/04* (2013.01); *B01J 39/02* (2013.01); *B01J 39/10* (2013.01); *B01J 49/53* (2017.01)

(58) Field of Classification Search
CPC . C01D 15/04; B01J 49/53; B01J 39/02; B01J 39/10; B01D 15/362; C01G 45/01;
(Continued)

(56) References Cited

U.S. PATENT DOCUMENTS 8,663,361 B1 * 3/2014 Krumhansl ............ B01D 11/04
423/208
11,634,789 B2 * 4/2023 Baxter ...................... C22B 3/44
423/179.5
(Continued)

FOREIGN PATENT DOCUMENTS

CN 100343399 A 10/2007
CN 106345394 A 1/2017
(Continued)

OTHER PUBLICATIONS

International Preliminary Report on Patentability for corresponding International Patent Application No. PCT/JP2022/015851 dated Aug. 19, 2022 (3 sheets).

*Primary Examiner* — Cam N. Nguyen
(74) *Attorney, Agent, or Firm* — Kratz, Quintos & Hanson, LLP

(57) ABSTRACT

Provided is a method for producing a lithium-containing solution that allows increasing a content rate of lithium in a solution after an eluting step, and suppressing an amount of an eluted solution used in a process after the eluting step, thus suppressing production cost of lithium. A method for producing a lithium-containing solution includes an adsorption step of bringing a lithium adsorbent obtained from lithium manganese oxide in contact with a low lithium-containing solution to obtain post-adsorption lithium man- (Continued)

ganese oxide, an eluting step of bringing the post-adsorption lithium manganese oxide in contact with an acid-containing solution to obtain an eluted solution, and a manganese oxidation step of oxidating manganese to obtain a lithium-containing solution with a suppressed manganese concentration. The adsorption step, the eluting step, and the manganese oxidation step are performed in this order, and the acid-containing solution includes the eluted solution with acid added. The method allows the usage amount of the acid in the eluting step to be suppressed, the content rate of lithium in the eluted solution after the eluting step to be increased, and thus the production cost of the lithium-containing solution to be suppressed.

2 Claims, 1 Drawing Sheet

(51) Int. Cl.

| | |
|---|---|
| *B01J 39/10* | (2006.01) |
| *B01J 49/53* | (2017.01) |
| *C01G 45/01* | (2025.01) |
| *C01G 45/02* | (2025.01) |
| *C01G 45/1221* | (2025.01) |
| *C22B 3/24* | (2006.01) |
| *C22B 3/44* | (2006.01) |
| *C22B 26/12* | (2006.01) |

(58) Field of Classification Search
CPC . C01G 45/02; C01G 45/1221; C01P 2006/80; Y02P 10/20; C22B 3/44; C22B 26/12; C22B 3/24
USPC ....................................................... 423/179.5
See application file for complete search history.

(56) References Cited

U.S. PATENT DOCUMENTS

| | | | |
|---|---|---|---|
| 2004/0237720 A1* | 12/2004 | Moyes ...................... | C25C 1/16 |
| | | | 75/725 |
| 2018/0280831 A1 | 10/2018 | Chung | |
| 2019/0044126 A1 | 2/2019 | Snydacker | |
| 2019/0276327 A1* | 9/2019 | Brown .................... | C22B 26/12 |
| 2022/0024776 A1 | 1/2022 | Takano | |
| 2023/0079295 A1* | 3/2023 | Matsumoto ............ | C01D 15/04 |

FOREIGN PATENT DOCUMENTS

| | | |
|---|---|---|
| CN | 111182953 A | 5/2020 |
| CN | 111809067 A | 10/2020 |
| EP | 2644720 A1 | 10/2013 |
| KR | 10-1662725 B1 | 10/2016 |
| WO | 2020/116607 A1 | 6/2020 |

* cited by examiner

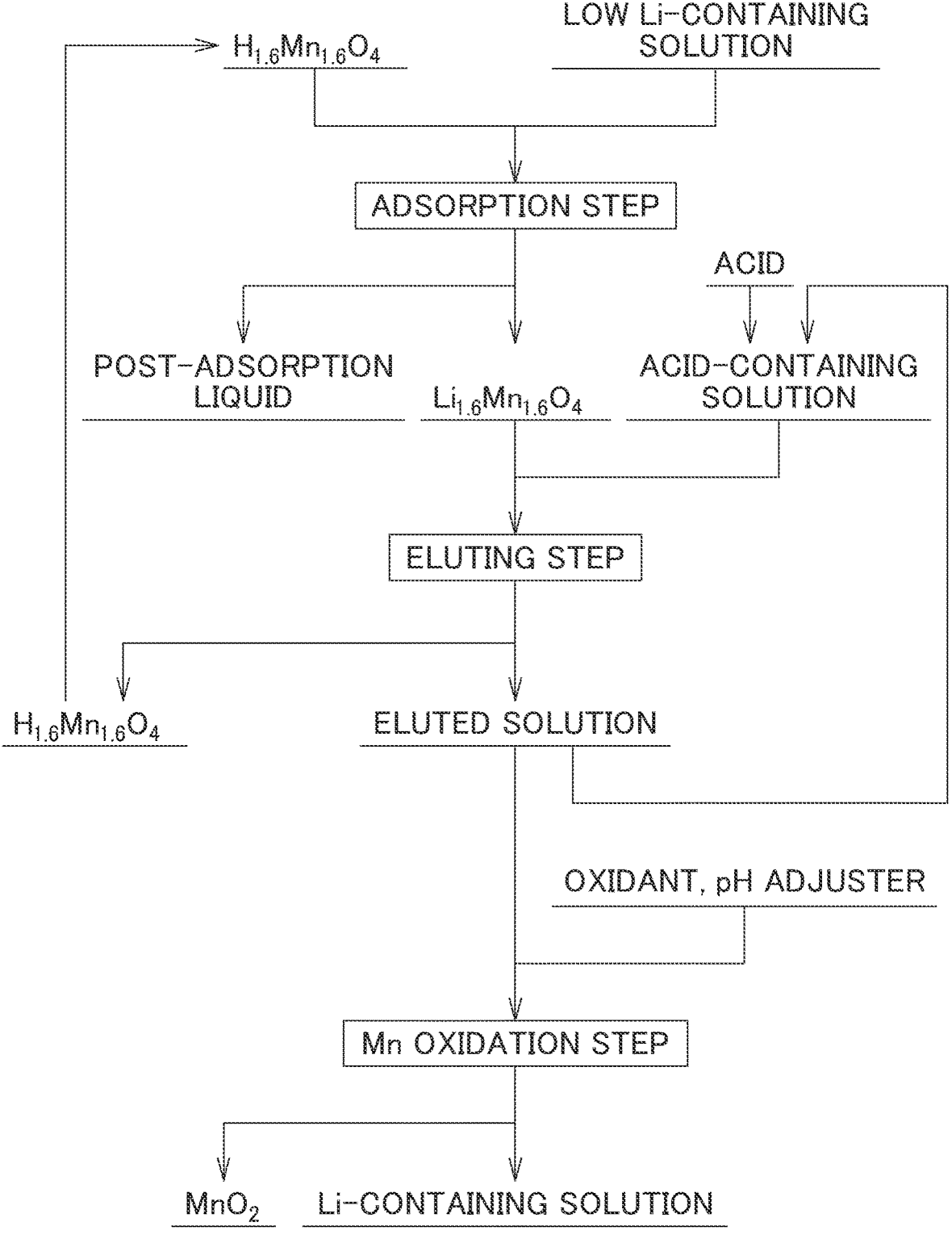

METHOD FOR PRODUCING LITHIUM-CONTAINING SOLUTION

BACKGROUND

1. Technical Field

The present invention relates to a method for producing a lithium-containing solution. More particularly, the present invention relates to a method for producing a lithium-containing solution that allows increasing a content rate of lithium in a solution after an eluting step, and suppressing an amount of an eluted solution used in a process after the eluting step, thus suppressing production cost of lithium.

2. Related Art $\lambda$-$MnO_2$ having a spinel type structure (such as $HMn_2O_4$, $H_{1.33}Mn_{1.67}O_4$, or $H_{1.6}Mn_{1.6}O_4$) obtained by bringing lithium manganese oxide (such as $LiMn_2O_4$, $Li_{1.33}Mn_{1.67}O_4$, or $Li_{1.6}Mn_{1.6}O_4$) in contact with mineral acid such as hydrochloric acid is known to selectively adsorb lithium. When using the $\lambda$-$MnO_2$ to collect lithium, since the $\lambda$-$MnO_2$ does not adsorb impurities, it provides advantages such as substantially reducing a usage amount of a neutralizer in collecting lithium. Therefore, the above method is expected to be used commercially. A method for producing a lithium-containing solution using the $\lambda$-$MnO_2$ is disclosed in WO 2020/116607.

SUMMARY

The above-described method for producing a lithium-containing solution allows reducing the usage amount of agents (especially a neutralizer) and thus has a significant advantage in terms of cost. However, in order to commercially use the production method, a need for further cost reduction leads to a problem. For example, in the production method, to maintain a reaction in the eluting step, an acid concentration of an acid-containing solution added in the eluting step must be maintained within a predetermined range. Accordingly, an amount of the eluted solution used in a process after the eluting step increases, and a need for an increased facility size after the eluting step leads to a problem.

In view of the above circumstances, an object of the present invention is to provide a method for producing a lithium-containing solution that allows increasing a content rate of lithium in a solution after an eluting step, and suppressing an amount of an eluted solution used in a process after the eluting step, thus suppressing production cost of lithium.

Solutions to the Problems

The method for producing a lithium-containing solution of a 1st invention comprises an adsorption step of bringing a lithium adsorbent obtained from lithium manganese oxide in contact with a low lithium-containing solution to obtain post-adsorption lithium manganese oxide, an eluting step of bringing the post-adsorption lithium manganese oxide in contact with an acid-containing solution to obtain an eluted solution, and a manganese oxidation step of oxidating manganese by adding an oxidant and a pH adjuster to the eluted solution to obtain a lithium-containing solution with a suppressed manganese concentration. The adsorption step, the eluting step, and the manganese oxidation step are performed in this order, and the acid-containing solution includes the eluted solution with acid added.

In the method for producing a lithium-containing solution of a 2nd invention, which is in the 1st invention, the acid is added such that a hydrogen ion concentration of the acid-containing solution used in the eluting step is 0.1 mol/L or more and 4.0 mol/L or less.

In the method for producing a lithium-containing solution of a 3rd invention, which is in the 1st invention or the 2nd invention, the eluted solution is used repeatedly for 5 times or more and 11 times or less in the eluting step.

Effects of the Invention

According to the 1st invention, by repeatedly using the eluted solution for the acid-containing solution, the usage amount of the acid in the eluting step is suppressed. Therefore, the production cost of the lithium-containing solution can be suppressed. Further, since the content rate of lithium in the eluted solution after the eluting step can be increased, a whole amount of the lithium-containing solution can be suppressed, allowing the facility size in the post-process to be suppressed and a load of the process for obtaining lithium in a solid state to be reduced.

According to the 2nd invention, the acid is added such that the hydrogen ion concentration of the acid-containing solution is within a predetermined range, the reaction in the eluting step occurs efficiently.

According to the 3rd invention, by repeatedly using the eluted solution for only the predetermined number of times, the content rate of lithium in the solution after the eluting step can be further increased, and the whole amount of the lithium-containing solution can be further suppressed, allowing the facility size in the post-process to be further suppressed, and the usage amount of agents in the post-process, such as the manganese oxidation step, to be further suppressed.

BRIEF DESCRIPTION OF DRAWINGS

FIG. 1 is a flow chart of a method for producing a lithium-containing solution according to an embodiment of the present invention.

DETAILED DESCRIPTION

Next, the embodiments of the present invention are described below based on the drawings. However, the following embodiments illustrate the method for producing a lithium-containing solution for realization of the technical idea of the present invention, and thus the present invention does not intend to limit the method for producing a lithium-containing solution to the following method.

The method for producing a lithium-containing solution according to the present invention includes an adsorption step of bringing a lithium adsorbent obtained from lithium manganese oxide in contact with a low lithium-containing solution to obtain post-adsorption lithium manganese oxide, an eluting step of bringing the post-adsorption lithium manganese oxide in contact with an acid-containing solution to obtain an eluted solution, and a manganese oxidation step of oxidating manganese by adding an oxidant and a pH adjuster to the eluted solution to obtain a lithium-containing solution with a suppressed manganese concentration. The adsorption step, the eluting step, and the manganese oxidation step are performed in this order, and the acid-containing solution includes the eluted solution with acid added.

By repeatedly using the eluted solution for the acid-containing solution, the usage amount of the acid in the eluting step is suppressed. Therefore, the production cost of the lithium-containing solution can be suppressed. Further, since the content rate of lithium in the eluted solution after the eluting step can be increased, a load of the process for obtaining lithium in a solid state can be reduced.

It is preferred that the acid is added such that a hydrogen ion concentration of the acid-containing solution used in the eluting step is 0.1 mol/L or more and 4.0 mol/L or less. Adding the acid such that a hydrogen ion concentration of the acid-containing solution is within a predetermined range causes the reaction in the eluting step to occur efficiently.

It is preferred that the eluted solution in the eluting step is used repeatedly for 5 times or more and 11 times or less. By using the eluted solution for only a predetermined number of times, the content rate of lithium can be further increased, and the usage amount of agents in the manganese oxidation step can be further suppressed.

Embodiments (Preceding Stage of the Adsorption Step)

The adsorption step includes bringing a lithium adsorbent in contact with a low lithium-containing solution to obtain post-adsorption lithium manganese oxide. A method for obtaining a lithium adsorbent to be used in the adsorption step is described as follows. Note that FIG. 1 illustrates a flow chart of the method for producing a lithium-containing solution according to an embodiment of the present invention, and the "preceding stage of the adsorption step" is the stage where the $H_{1.6}Mn_{1.6}O_4$ in the uppermost stage in FIG. 1 is obtained.

Lithium manganese oxide is subjected to acid treatment to give a lithium adsorbent as depicted in Formula 1. Note that in Formula 1, lithium manganese oxide is represented by $Li_{1.6}Mn_{1.6}O_4$, but lithium manganese oxide is not limited thereto. For example, $Li_{1.33}Mn_{1.67}O_4$ can also be used. Specifically, when lithium manganese oxide is $Li_{1.6}Mn_{1.6}O_4$, the resulting lithium adsorbent is $H_{1.6}Mn_{1.6}O_4$. However, when lithium manganese oxide is $Li_{1.33}Mn_{1.67}O_4$, for example, the resulting lithium adsorbent is $H_{1.33}Mn_{1.67}O_4$. Moreover, acid to be used for the acid treatment is specified as HCl, but the example of the acid is not limited thereto. For example, sulfuric acid, nitric acid, or the like can also be used herein.

The form of lithium manganese oxide is determined in view of lithium adsorption in the adsorption step. For example, lithium manganese oxide can be in various forms such as a powdery form, a granular form resulting from granulation of the powder, and a columnar form resulting from spraying to column fibers. Acid treatment is performed to obtain $H_{1.6}Mn_{1.6}O_4$ as a lithium adsorbent, for example. The form of the lithium adsorbent is the same as that of the lithium manganese oxide before the acid treatment.

$$Li_{1.6}Mn_{1.6}O_4 + 1.6HCl \rightarrow H_{1.6}Mn_{1.6}O_4 + 1.6LiCl \qquad \text{[Formula 1]}$$

(Adsorption Step)

FIG. 1 depicts a flow chart of the method for producing a lithium-containing solution according to the embodiment of the present invention. The adsorption step involves bringing a lithium adsorbent in contact with a low lithium-containing solution for ion exchange reaction between H and Li depicted in Formula 2, thereby obtaining post-adsorption lithium manganese oxide. In the Description, the lithium manganese oxide obtained by the adsorption step may be referred to as post-adsorption lithium manganese oxide.

$$H_{1.6}Mn_{1.6}O_4 + 1.6LiCl \rightarrow Li_{1.6}Mn_{1.6}O_4 + 1.6HCl \qquad \text{[Formula 2]}$$

The low lithium-containing solution corresponds to seawater or salt lake brine, for example. For example, seawater contains an average of 0.17 ppm lithium. However, in these low lithium-containing solutions, in addition to lithium, elements such as sodium, magnesium, and calcium are dissolved. According to the method for producing a lithium-containing solution of the present invention, lithium can be selectively collected from a low lithium-containing solution in which these elements are dissolved. In addition, the low lithium-containing solution means that the lithium content per unit volume thereof is lower than that of a lithium-containing solution described later.

In the adsorption step, a method for bringing a low lithium-containing solution in contact with an adsorbent differs depending on the form of the adsorbent. For example, when the adsorbent is in a powdery form, examples include one method in which a predetermined amount of the adsorbent is introduced into a low lithium-containing solution followed by stirring of the mixture for a predetermined time period, for the low lithium-containing solution to contact the adsorbent, so that lithium is adsorbed to the adsorbent. When the adsorbent is in a granular form, examples include one method in which the granular adsorbent is sealed in a container for liquid passage, and a low lithium-containing solution is passed through the container for the low lithium-containing solution to contact the adsorbent, so that lithium is adsorbed to the adsorbent. When the adsorbent is sprayed over the column fibers, examples include one method in which the passage of the low lithium-containing solution through the column causes the low lithium-containing solution to contact the adsorbent, so that lithium is adsorbed to the adsorbent. Note that when the low lithium-containing solution is passed through the column, the solution may be repeatedly passed through the column so as to ensure the required number of contact with the adsorbent.

Through the adsorption step, the adsorbent becomes post-adsorption lithium manganese oxide. Further, the low lithium-containing solution becomes a post-adsorption liquid after lithium adsorption to the adsorbent. The post-adsorption liquid is discharged into sea or lake from which the low lithium-containing solution has been collected. At this time, the post-adsorption liquid is discharged after treated by neutralization or the like so as to be suitable for discharge.

(Eluting Step)

In the eluting step, the post-adsorption lithium manganese oxide brought in contact with an acid-containing solution for reaction depicted in Formula 3 produces an eluted solution. Here, the post-adsorption lithium manganese oxide is regenerated as a lithium adsorbent through exchange reaction between cations including $Li^+$ and $H^+$, and then the lithium adsorbent is used again in the adsorption step.

$$Li_{1.6}Mn_{1.6}O_4 + 1.6HCl \rightarrow H_{1.6}Mn_{1.6}O_4 + 1.6LiCl \qquad \text{[Formula 3]}$$

In the embodiment, the acid-containing solution includes a solution of acid alone such as hydrochloric acid, and a solution prepared by adding acid to the eluted solution obtained through performing the eluting step once. For example, in the embodiment, the eluting step is divided into a plurality of stages, and in the first stage, the acid-containing solution is a solution of acid alone. In the second stage onward, an eluted solution obtained in the previous stage is used and, by using a solution prepared by adding acid to the eluted solution, the eluting step in the second stage onward is performed.

The smaller a pH value of the acid-containing solution used in the eluting step is, the more the reaction depicted in Formula 3 progresses. However, since the pH value of the acid-containing solution increases as the reaction depicted in Formula 3 progresses to some extent, the reaction depicted in Formula 3 stops progressing. Conventionally, to avoid such state, a large amount of the acid-containing solution has been supplied, thus increasing the amount of the eluted solution. In this application, the eluting step is performed while being divided into a plurality of stages, and in the second stage onward of the plurality of stages, a solution prepared by adding acid to the eluted solution obtained in the previous stage is used as the acid-containing solution.

By repeatedly using the eluted solution for the acid-containing solution, the usage amount of the acid in the eluting step can be suppressed. Therefore, the content rate of lithium in the eluted solution after the eluting step can be increased, and the amount of the eluted solution used in the process after the eluting step can be reduced. That is, in the eluting step, when the pH in the solution reaches or exceeds a predetermined value, the reaction depicted in Formula 3 does not occur, and the hydrogen ions remain in the eluted solution. By newly adding acid to the eluted solution obtained in the eluting step, the pH value of the acid-containing solution can be decreased together with the remaining free acid, and the amount of the eluted solution used in the process after the eluting step can be suppressed as a whole, while the content rate of lithium in the eluted solution can be increased.

By increasing the content rate of lithium in the eluted solution as above, the facility size in the post-process can be suppressed, and the load of the process for obtaining lithium in a solid state can be reduced. That is, as the content rate of lithium increases, the amount of the lithium-containing solution itself can be reduced, and the facility size in the post-process need not be increased. In addition, when obtaining lithium in a solid state, an amount of time to boil the solution can be shortened, and the pH adjuster in the manganese oxidation step described later, or an amount of the pH adjuster in the neutralizing step provided after the manganese oxidation step can be suppressed. The neutralization step is provided, for example, to remove magnesium. A solution containing a high concentration of lithium can be shipped directly to a customer.

While a case where the eluting step is divided into a plurality of stages has been described, the eluting step is not limited to this form. For example, a case where acid is continuously added to the eluted solution and becomes the acid-containing solution is also included.

The hydrogen ion concentration of the acid-containing solution to be brought in contact with the post-adsorption lithium manganese oxide in the eluting step of the embodiment is preferably 0.1 mol/L or more and 4.0 mol/L or less, and is more preferably 0.5 mol/L or more and 2.0 mol/L or less.

In the eluting step, the hydrogen ion concentration of the acid-containing solution is 0.1 mol/L or more and 4.0 mol/L or less, so that in the eluting step, the dissolution of the whole lithium manganese oxide can be suppressed while maintaining the efficiency of exchange reaction between cations including $Li^+$ and $H^+$. Specifically, the repeated use of the lithium adsorbent becomes possible.

When the hydrogen ion concentration of the acid-containing solution is lower than 0.1 mol/L, exchange reaction between cations cannot be sufficiently performed, and thus lowers the efficiency of the exchange reaction. Further, when the concentration of the acid-containing solution is higher than 4.0 mol/L, the whole lithium manganese oxide is dissolved in the acid-containing solution, so that the post-adsorption lithium manganese oxide cannot be used again as a lithium adsorbent. Note that the acid used for the acid-containing solution is preferably hydrochloric acid but is not limited to this. For example, sulfuric acid, acetic acid or the like may also be used herein.

Adding the acid such that the hydrogen ion concentration of the acid-containing solution is within a predetermined range causes a reaction in the eluting step to occur efficiently.

In the eluting step of the embodiment, it is preferred that the eluted solution is used repeatedly for 5 times or more and 11 times or less. It is further preferred that the eluted solution is used repeatedly for 7 times or more and 9 times or less.

The repeated use of the eluted solution for a predetermined number of times allows the further increased content rate of lithium in the solution after the eluting step, and the usage amount of agents in the post-process such as the manganese oxidation step can be further suppressed.

The mode of contact between the post-adsorption lithium manganese oxide and the acid-containing solution in the eluting step differs depending on the form of lithium manganese oxide. For example, when lithium manganese oxide is in a powdery form, examples include one method in which post-adsorption lithium manganese oxide powder is introduced into an acid-containing solution, then the mixture is stirred, and the post-adsorption lithium manganese oxide is brought into contact with the acid-containing solution. When lithium manganese oxide is in a granular form or in a form sprayed over column fibers, examples include one method in which an acid-containing solution is passed through the container for liquid passage while lithium manganese oxide granules and the column are being housed within the container for liquid passage, the post-adsorption lithium manganese oxide is brought into contact with the acid-containing solution.

(Manganese Oxidation Step)

In the manganese oxidation step, an oxidant and a pH adjuster are added to the eluted solution obtained in the eluting step for oxidizing divalent manganese to tetravalent manganese, thereby obtaining a lithium-containing solution with a suppressed manganese concentration. Since tetravalent manganese has low solubility, it precipitates in the solution. This can suppress the concentration of manganese contained in the eluted solution. Further, the precipitated manganese can be used again as a raw material of the lithium adsorbent.

To oxidize divalent manganese to tetravalent manganese, an oxidant and a pH adjuster are added to the eluted solution. When the oxidant and the pH adjuster are added, it is preferred that a pH is adjusted to be in a range of 3 or more and 7 or less while a redox potential of the silver-silver chloride electrodes is adjusted to be 600 mV or more and 1100 mV or less. In other words, the pH and the redox potential are measured simultaneously, while the oxidant and the pH adjuster are added simultaneously or alternatingly so as to make it within the range described above. As an oxidant, for example, sodium hypochlorite, sodium chlorite, ozone, permanganate or the like can be used, but are not limited thereto; using any materials whose redox potential is adjustable will present no problems. As a pH adjuster, for example, alkaline-neutralizing agents such as sodium hydroxide and calcium hydrate can be used, but are not limited thereto, and use of any materials whose pH is adjustable will present no problems.

(Subsequent Stage of Manganese Oxidation Step)

In the lithium-containing solution obtained in the manganese oxidation step, lithium is present in the form of lithium chloride (LiCl) in this embodiment. Hence, alkali is added to the solution or the solution is concentrated by heating, thus giving lithium in the form of lithium carbonate, for example.

Further, the post-adsorption lithium manganese oxide is treated with an acid-containing solution to give a lithium adsorbent, and thus the lithium adsorbent is used again in the adsorption step.

WORKING EXAMPLES

Hereinafter, specific examples of the method for producing a lithium-containing solution of the present invention will be further described in detail, but the present invention is not limited by these examples.

Working Example 1

(Adsorption Step)

In a glass column with a diameter of 20 mm, 10 ml of lithium adsorbent $H_{1.6}Mn_{1.6}O_4$ in a powder form was retained. A solution in which lithium is dissolved to simulate salt lake brine, which is a low lithium-containing solution, was passed through this column, and the lithium adsorbent became $Li_{1.6}Mn_{1.6}O_4$, which is a post-adsorption lithium manganese oxide.

(Eluting Step)

The post-adsorption lithium manganese oxide in the glass column and the acid-containing solution were brought in contact. As the first stage of the eluting step, the acid-containing solution was a hydrochloric acid alone with a hydrogen ion concentration of 0.5 mol/L. At this time, the pH of the acid-containing solution was 0.35. At a liquid passing rate of 1.67 ml/min, 75 ml of the acid-containing solution was passed through the column filled up with the adsorbent. Here, units SV and BV may be used as the liquid passing rate and the liquid passing quantity, respectively. SV is an abbreviation for Space Velocity, indicating the liquid passing quantity (unit is BV, described later) per unit time (1 hour). That is, the above 1.67 ml/min is described as SV10. Further, BV is an abbreviation for Bed Volume that is a unit representing how many times of the volume of the lithium adsorbent in the column. That is, the above 75 ml is described as BV7.5. The solution flowed out from the column was entirely mixed to become a uniform solution. The solution obtained in the first stage of the eluting step was used as the first eluted solution. The measured pH of the first eluted solution was 1. Therefore, it is understood that free acid remains to exist after the eluting step in the first eluted solution.

Next, as the second stage of the eluting step, 35% hydrochloric acid was added to the first eluted solution to have a hydrogen ion concentration of 0.5 mol/L to be used as the acid-containing solution. The liquid passing rate and the liquid passing quantity were the same as those in the first stage. The solution flowed out from the column was used as the second eluted solution.

Analysis values of element concentrations in the first eluted solution and the second eluted solution are depicted in Table 1. It is understood that the content rate of lithium increased in the second eluted solution which used the first eluted solution with acid added as the acid-containing solution.

TABLE 1

| Element name | Al | B | Ca | K | Li | Mg | Mn | Na |
|---|---|---|---|---|---|---|---|---|
| First Mn remaining Li-containing solution (g/L) | 0.095 | 0.16 | 0.28 | 0.06 | 1.8 | 0.4 | 1.87 | 0.13 |
| Second Mn remaining Li-containing solution (g/L) | 0.18 | 0.27 | 0.49 | 0.094 | 2.6 | 0.69 | 1.8 | 0.15 |

(Manganese Oxidation Step)

The manganese oxidation step was performed using the second eluted solution. At this time, an oxidant and a pH adjuster were used to obtain a lithium-containing solution.

Working Example 2

In Working Example 2, an acid-containing solution with hydrochloric acid added to have a hydrogen ion concentration of 0.1 mol/L was used in the second stage of the eluting step to obtain a second eluted solution. Other conditions were the same as those in Working Example 1. Analysis values of element concentrations in the first eluted solution and the second eluted solution are depicted in Table 2. It is understood that the content rate of lithium increased in the second eluted solution which used the first eluted solution with acid added as the acid-containing solution.

TABLE 2

| Element name | Al | B | Ca | K | Li | Mg | Mn | Na |
|---|---|---|---|---|---|---|---|---|
| First Mn remaining Li-containing solution (g/L) | 0.095 | 0.16 | 0.28 | 0.06 | 1.8 | 0.4 | 1.87 | 0.13 |
| Second Mn remaining Li-containing solution (g/L) | 0.11 | 0.18 | 0.32 | 0.07 | 1.9 | 0.46 | 1.86 | 0.13 |

Comparative Example 1

In Comparative Example 1, the second eluted solution was obtained without adding hydrochloric acid at all in the second stage of the eluting step. Other conditions were the same as those in Working Example 1. Analysis values of element concentrations in the first eluted solution and the second eluted solution are depicted in Table 3. It is understood that none of the elements showed any changes in the content rate.

TABLE 3

| Element name | Al | B | Ca | K | Li | Mg | Mn | Na |
|---|---|---|---|---|---|---|---|---|
| First Mn remaining Li-containing solution (g/L) | 0.095 | 0.16 | 0.28 | 0.06 | 1.8 | 0.4 | 1.87 | 0.13 |
| Second Mn remaining Li-containing solution (g/L) | 0.095 | 0.16 | 0.28 | 0.06 | 1.8 | 0.4 | 1.87 | 0.13 |

Working Example 1a

In Working Example 1, analysis values of respective elements in the eluted solutions up to the second stage were obtained. In Working Example 1a, the eluting step was performed up to the fourteenth stage, and the analysis value of lithium in the eluted solution at each stage was obtained. Other conditions were the same as those in Working Example 1. Results are depicted in Table 4.

TABLE 4

| Element name | Li |
|---|---|
| First Mn remaining Li-containing solution (g/L) | 1.8 |
| Second Mn remaining Li-containing solution (g/L) | 2.6 |
| Third Mn remaining Li-containing solution (g/L) | 3.5 |
| Fourth Mn remaining Li-containing solution (g/L) | 4.2 |
| Fifth Mn remaining Li-containing solution (g/L) | 4.9 |
| Sixth Mn remaining Li-containing solution (g/L) | 5.2 |
| Seventh Mn remaining Li-containing solution (g/L) | 5.7 |
| Eighth Mn remaining Li-containing solution (g/L) | 6.1 |
| Ninth Mn remaining Li-containing solution (g/L) | 6.3 |
| Tenth Mn remaining Li-containing solution (g/L) | 6.5 |
| Eleventh Mn remaining Li-containing solution (g/L) | 6.6 |
| Twelfth Mn remaining Li-containing solution (g/L) | 6.9 |
| Thirteenth Mn remaining Li-containing solution (g/L) | 7.2 |
| Fourteenth Mn remaining Li-containing solution (g/L) | 7.2 |

As depicted in table 4, it is understood that the content rate of lithium increases according to the increase of the repeated number of times up to the sixth eluted solution (solution after the eluted solution has been used repeatedly for five times). Further, it is understood that the content rate of lithium does not increase almost at all even as the repeated number of times increase in the thirteenth eluted solution (solution after the eluted solution has been used repeatedly for twelve times) onward. Based on the results, it is understood that repeatedly using the eluted solution for 5 times or more and 11 times or less is preferred to increase the content rate of lithium in the eluted solution.

What is claimed is:

1. A method for producing a lithium-containing solution, comprising:

an adsorption step of bringing a lithium adsorbent obtained from lithium manganese oxide in contact with a lithium-containing solution to obtain post-adsorption lithium manganese oxide;

an eluting step of bringing the post-adsorption lithium manganese oxide in contact with an acid-containing solution to obtain an eluted solution; and a manganese oxidation step of oxidating manganese by adding an oxidant and a pH adjuster to the eluted solution to obtain a lithium-containing solution with a suppressed manganese concentration, wherein the adsorption step, the eluting step, and the manganese oxidation step are performed in this order, and the acid-containing solution includes the eluted solution with acid added, and wherein:

in the manganese oxidation step, the oxidant is selected from the group consisting of sodium hypochlorite, sodium chlorite, ozone, and permanganate.

2. A method for producing a lithium-containing solution, comprising:

an adsorption step of bringing a lithium adsorbent obtained from lithium manganese oxide in contact with a lithium-containing solution to obtain post-adsorption lithium manganese oxide;

an eluting step of bringing the post-adsorption lithium manganese oxide in contact with an acid-containing solution to obtain an eluted solution; and a manganese oxidation step of oxidating manganese by adding an oxidant and a pH adjuster to the eluted solution to obtain a lithium-containing solution with a suppressed manganese concentration, wherein the adsorption step, the eluting step, and the manganese oxidation step are performed in this order, and the acid-containing solution includes the eluted solution with acid added, and wherein:

in the manganese oxidation step, the pH adjuster is selected from the group consisting of sodium hydroxide and calcium hydrate.

* * * * *